United States Patent
Burckhardt et al.

(10) Patent No.: US 10,174,150 B2
(45) Date of Patent: Jan. 8, 2019

(54) LIQUID-APPLIED WATERPROOFING MEMBRANE FOR ROOFS

(71) Applicant: SIKA TECHNOLOGY AG, Baar (CH)

(72) Inventors: Urs Burckhardt, Zurich (CH); Michael Byrne, Lytham (GB); Alexander Coward, Sale (GB); Mark Gatrell, Chipping Preston (GB)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/324,384

(22) PCT Filed: Jul. 8, 2015

(86) PCT No.: PCT/EP2015/065619
§ 371 (c)(1),
(2) Date: Jan. 6, 2017

(87) PCT Pub. No.: WO2016/005457
PCT Pub. Date: Jan. 14, 2016

(65) Prior Publication Data
US 2017/0198081 A1 Jul. 13, 2017

(30) Foreign Application Priority Data
Jul. 9, 2014 (EP) .................................... 14176335

(51) Int. Cl.
*C08G 18/32* (2006.01)
*C09D 175/08* (2006.01)
*C08G 18/10* (2006.01)
*C08G 18/12* (2006.01)
*C08G 18/48* (2006.01)

(52) U.S. Cl.
CPC ......... *C08G 18/3256* (2013.01); *C08G 18/10* (2013.01); *C08G 18/12* (2013.01); *C08G 18/3206* (2013.01); *C08G 18/48* (2013.01); *C09D 175/08* (2013.01); *C08G 2190/00* (2013.01)

(58) Field of Classification Search
CPC ............ C08G 18/3256; C08G 18/3206; C08G 18/12; C08G 18/48; C09D 175/08
See application file for complete search history.

(56) References Cited

U.S. PATENT DOCUMENTS

| 2005/0065276 A1 | 3/2005 | Burckhardt et al. |
| 2007/0276058 A1 | 11/2007 | Burckhardt et al. |
| 2015/0148449 A1 | 5/2015 | Domanowski et al. |

FOREIGN PATENT DOCUMENTS

| EP | 1 329 469 A1 | 7/2003 | |
| EP | 1329469 A1 * | 7/2003 | ......... C08G 18/0823 |
| WO | WO 03/059977 A1 | 7/2003 | |
| WO | WO 2004/013200 A1 | 2/2004 | |
| WO | WO 2013/182234 A1 | 12/2013 | |

OTHER PUBLICATIONS

Nov. 7, 2017 Office Action issued in European Patent Application No. 15735693.2.
International Search Report (PCT/ISA/210) dated Jul. 29, 2015, by the European Patent Office as the International Searching Authority for International Application No. PCT/EP2015/065619.
Written Opinion (PCT/ISA/237) dated Jul. 29, 2015, by the European Patent Office as the International Searching Authority for International Application No. PCT/EP2015/065619.
Jul. 4, 2018 Office Action issued in Australian Patent Application No. 2015286698.
May 22, 2018 Office Action issued in Chilean Patent Application No. 201700012.
Jan. 10, 2018 Office Action issued in Chilean Patent Application No. 201700012.

* cited by examiner

*Primary Examiner* — William P Fletcher, III
(74) *Attorney, Agent, or Firm* — Oliff PLC

(57) ABSTRACT

A one-part moisture-curing liquid-applied waterproofing membrane as disclosed includes a polyurethane polymer obtained from at least one polyether polyol and at least one diisocyanate, and an aldimine of the formula (I). The membrane has a long shelf life stability with both aromatic and aliphatic isocyanates, a low viscosity at low solvent content, a sufficiently long open time to allow hand application and cures fast to a solid elastic material of high strength and high elongation. The released aldehyde is non-toxic and low flammable and evaporates quickly out of the membrane causing only minimal odor emission. The membrane has high crack-bridging qualities in a broad temperature range and is easily overcoatable without interlayer adhesion problems, which makes it particularly suitable for roofing applications.

19 Claims, No Drawings

LIQUID-APPLIED WATERPROOFING MEMBRANE FOR ROOFS

FIELD OF THE INVENTION

The invention relates to a liquid-applied waterproofing membrane based on one-part moisture-curing polyurethane, in particular for roofing applications.

BACKGROUND OF THE INVENTION

Liquid-applied waterproofing membranes are known. In roofing applications they are used as an alternative to prefabricated sheet membranes, offering easier application especially in the case of complex roof geometries and for refurbishment tasks, providing a flexible seamless roof coating which is fully adhered to the substrate.

Liquid-applied waterproofing membranes on roofs have to fulfill demanding requirements. They need to have a low viscosity to be applied as self-levelling coatings and a sufficiently long open time to enable hand application, but still cure fast in order to quickly lose their vulnerability. When fully cured the roofing membrane needs to have durable elasticity and strength in order to protect the building effectively from water ingress in a broad temperature range and under outdoor weathering conditions, such as wind forces, ponding water, frost, strong sunlight irradiation, microbial attack and root penetration.

State-of-the-art liquid-applied waterproofing membranes are often reactive polyurethane compositions, formulated as one-part or as two-part systems, also called single-component or two-component systems, respectively. Two-part systems are more complex to apply, requiring special mixing equipment and proper metering of the two components, since mistakes in mixing quality and/or stoichiometry strongly affect the membrane performance. One-part systems are easy to apply, but prone to curing defects. State-of-the-art one-part systems are based on aliphatic isocyanates and comprise blocked amine hardeners, in particular oxazolidines, to prevent excessive gassing from carbon dioxide formation on curing. They generally contain considerable amounts of solvents to guarantee low viscosity and sufficient shelf life, which is a disadvantage in view of tightening VOC regulations in many countries. Further drawbacks of conventional one-part membranes are related to slow curing and unpleasant odours caused by the emission of the blocking agent, a volatile aldehyde or ketone of strong smell.

To use aromatic instead of aliphatic isocyanates would be interesting from a cost point of view. Moreover aromatic isocyanates afford fast curing properties and high mechanical strength. However, in state-of-the-art one-part waterproofing membranes aromatic isocyanates such as MDI or TDI typically lead to problems with shelf life stability due to premature curing reactions between the aromatic isocyanate groups and the usual blocked amine hardeners. WO 2004/013200 discloses one-part compositions based on aromatic isocyanates comprising special polyaldimines as blocked amine hardeners. These polyaldimines are based on high molecular weight aldol esters such as 2,2-dimethyl-3-lauroyloxypropanal. These compositions have good shelf life stability, but are limited in strength development due to the released high molecular weight aldehyde, which remains in the cured membrane and softens it, acting as a plasticizer. The aldehyde may also migrate to the surface of the the membrane and cause bleeding, thereby limiting the overcoatability of the membrane.

WO 03/059977 discloses one-part compositions based on aromatic isocyanates comprising polyaldimines from lower molecular weight aldehydes. These compositions have good shelf life stability, but are too high in viscosity and therefore unsuitable as liquid-applied waterproofing membranes.

SUMMARY OF THE INVENTION

The task of this invention is to provide a one-part liquid-applied waterproofing membrane useful for roofing applications, which may be based on aromatic isocyanates, having good shelf life stability and good workability at low solvent content, in particular less than 200 g VOC per liter, as well as fast and reliable curing properties and high strength and elasticity.

Surprisingly it was found that the liquid-applied waterproofing membrane according to claim 1 fulfills this task and has additional benefits. It has a very good shelf life stability, good application properties, in particular low viscosity at low solvent content, low odour and good self-levelling properties. It has a sufficiently long open time to allow hand application and is tolerant towards adverse application conditions, such as high humidity and early rainfall. It has fast and reliable curing properties and cures to an elastic material with good mechanical properties, affording high crack-bridging qualities in a broad temperature range. Despite the low solvent content, it is well compatible with a non-woven glass fibre mesh used as a reinforcement, providing good wetting and softening of the mesh and thus allowing the mesh to be fully incorporated into the membrane. The aldehyde released upon curing is non-toxic and of low odour and low flammability. Its odour and flammability are much lower than those of e.g. isobutyric aldehyde, which is released from typical state-of-the-art membranes. The aldehyde quickly evaporates from the membrane, causing only minimal odour emission for a short period of time. The cured membrane of claim 1 is not prone to bleeding and can thus be durably overcoated without the need for cleaning and without interlayer adhesion problems. The easy overcoatability and the good compatibility with a glass fibre mesh are key benefits when it comes to use the membrane as part of a modular system for waterproofing a surface, especially on a roof. These qualities enable the membrane to be particularly useful as a thick layer crack-bridging base coat of a waterproofing roofing system with good mechanical properties at reasonable cost, which is overcoatable by a protective top coat with high UV-resistance.

Other aspects of the invention are revealed in other independent claims. Preferred aspects of the invention are revealed in the dependent claims.

DETAILED DESCRIPTION OF THE INVENTION

The subject of the present invention is a one-part moisture-curing liquid-applied waterproofing membrane comprising
at least one isocyanate-functional polyurethane polymer obtained from at least one polyether polyol and at least one diisocyanate, and
at least one aldimine of the formula (I),

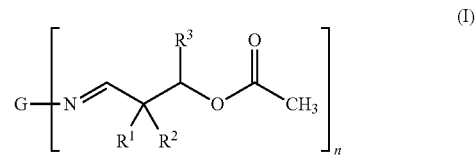

wherein n is from 2 to 6,

G is an n-valent aliphatic, arylaliphatic or cycloaliphatic hydrocarbyl moiety of molecular weight in the range of 28 to 5'000 g/mol optionally containing ether or urethane groups, $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring, and $R^3$ is hydrogen or a linear or branched $C_1$ to $C_{12}$ alkyl or arylalkyl or alkoxycarbonyl.

In this document, the term "one-part moisture-curing" refers to a liquid-applied membrane, which is contained in a single moisture-tight container, has a certain shelf life stability and cures when exposed to moisture.

In this document the term "liquid-applied waterproofing membrane" refers to a material which is applied in liquid form as a layer onto a substrate, and which cures to form an elastic membrane making the substrate waterproof.

In this document, the term "polyurethane polymer" includes all polymers prepared by the so-called diisocyanate polyaddition process. It includes isocyanate-functional polyurethane polymers obtained by reacting polyisocyanates and polyols, which may also be called prepolymers and are polyisocyanates themselves.

In this document the term "molecular weight" refers to the molar mass (given in grams per mole) of a molecule or a part of a molecule, also referred to as "moiety". The term "average molecular weight" refers to the number-average molecular weight ($M_n$) of an oligomeric or polymeric mixture of molecules or moieties.

In this document, substance names starting with "poly", such as polyol, polyisocyanate or polyamine, refer to substances carrying two or more of the respective functional groups (e.g. OH groups in the case of polyol) per molecule.

In this document an amine or an isocyanate is called "aliphatic" when its amino group or its isocyanate group, respectively, is directly bound to an aliphatic, cycloaliphatic or arylaliphatic moiety. The corresponding functional group is therefore called an aliphatic amino or an aliphatic isocyanate group, respectively.

In this document an amine or an isocyanate is called "aromatic" when its amino group or its isocyanate group, respectively, is directly bound to an aromatic moiety. The corresponding functional group is therefore called an aromatic amino or an aromatic isocyanate group, respectively.

The term "aromatic diisocyanate" refers to a molecule with two isocyanate groups directly bound to an aromatic moiety.

In this document the acronym "MDI" stands for the chemical substance "methylene diphenyl diisocyanate". The term includes any isomeric forms of MDI and any mixtures thereof, particularly 4,4'-diphenylmethane diisocyanate and/or 2,4'-diphenylmethane diisocyanate and/or 2,2'-diphenylmethane diisocyanate.

In this document the acronym "TDI" stands for the chemical substance "toluylene diisocyanate". The term includes any isomeric forms of TDI and any mixtures thereof, particularly 2,4-toluylene diisocyanate and/or 2,6-toluylene diisocyanate.

In this document, the term "primary amino group" refers to an $NH_2$-group bound to an organic moiety, and the term "secondary amino group" refers to a NH-group bound to two organic moieties which together may be part of a ring.

In this document the acronym "VOC" stands for "volatile organic compounds", which are organic substances having a vapour pressure of at least 0.01 kPa at a temperature of 293.14 K.

In this document, the term "solvent" refers to a liquid which is a VOC, which is able to dissolve isocyanate-functional polyurethane polymers as described in this document, and which does not carry any isocyanate-reactive functional groups.

In this document, the term "shelf life stability" refers to the ability of a composition to be stored at room temperature in a suitable container under exclusion of moisture for a certain time interval, in particular several months, without undergoing significant changes in application or end-use properties.

In this document, "room temperature" refers to a temperature of 23° C.

The liquid applied membrane of this invention comprises at least one isocyanate-functional polyurethane polymer obtained from the reaction of at least one polyether polyol with at least one diisocyanate.

In this reaction the isocyanate groups are in stoichiometric excess over the hydroxyl groups. Preferably the isocyanate to hydroxyl group ratio is in the range of 1.3 to 5, more preferably 1.5 to 3, particularly 1.8 to 2.8.

The diisocyanate and the polyether polyol are brought to reaction via known methods, preferably at temperatures between 50 and 100° C., optionally by using a suitable catalyst, optionally in the presence of a solvent or a plasticizer free from isocyanate-reactive groups.

Preferably the isocyanate-functional polyurethane polymer has a free isocyanate group content in the range of 2 to 10 weight-%, particularly in the range of 2.5 to 6 weight-%.

Preferably the isocyanate-functional polyurethane polymer has an average molecular weight in the range of 1'000 to 10'000 g/mol, more preferably in the range of 1'000 to 5'000 g/mol.

Preferably the isocyanate-functional polyurethane polymer has an average isocyanate functionality in the range of 1.7 to 3, more preferably 1.8 to 2.5.

Such a polyurethane polymer has a low viscosity and provides good mechanical properties.

Suitable diisocyanates to obtain the isocyanate-functional polyurethane polymer are the following:

Aliphatic diisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decanediisocyanate, 1,12-dodecanediisocyanate, lysine or lysine ester diisocyanate, cyclohexane-1,3- or -1,4-diisocyanate, 1-methyl-2,4- and -2,6-diisocyanatocyclohexane and any mixtures of these isomers ($H_6TDI$), 1-isocyanato-3,3,5-trimethyl-5-isocyanatomethyl-cyclohexane (isophoronediisocyanate or IPDI), perhydro-2,4'- and -4,4'-diphenylmethane diisocyanate ($H_{12}MDI$), 1,4-diisocyanato-2,2,6-trimethylcyclohexane (TMCDI), 1,3- or 1,4-bis-(isocyanatomethyl)cyclohexane, m- and p-xylylene diisocyanate (m- and p-XDI), m- and p-tetramethyl-1,4-xylylene diisocyanate (m- and p-TMXDI), bis-(1-isocyanato-1-methylethyl)naphthalene and dimer fatty acid isocyanates such as 3,6-bis-(9-isocyanatononyl)-4,5-di-(1-heptenyl)cyclohexene (dimeryl diisocyanate). Preferred thereof are HDI, TMDI, IPDI or $H_{12}MDI$. Particularly preferred is IPDI.

Aromatic diisocyanates, particularly MDI, TDI, 1,3- and/or 1,4-phenylene diisocyanate, 2,3,5,6-tetramethyl-1,4- diisocyanatobenzene, naphthalene-1,5-diisocyanate (NDI), 3,3'-dimethyl-4,4'-diisocyanatodiphenyl (TODI) or dianisidine diisocyanate (DADI. Preferred thereof are MDI and/or TDI.

The diisocyanate to obtain the isocyanate-functional polyurethane polymer is preferably an aromatic diisocyanate. A membrane based on aromatic diisocyanate is beneficial from a cost point of view and has particularly fast curing properties and particularly high mechanical strength.

Particularly preferred aromatic diisocyanates are MDI or TDI.

In a preferred embodiment of the invention, the diisocyanate to obtain the isocyanate-functional polyurethane polymer is MDI. Such a liquid-applied membrane has specific benefits. MDI is of very low volatility, enabling membranes with good health and safety properties. Membranes based on MDI cure particularly fast and develop particularly high strength.

MDI can preferably be used as pure MDI, particularly as a mixture of 2,4'-diphenylmethane diisocyanate and 4,4'-diphenylmethane diisocyanate in about equal amounts, commercially available e.g. as Desmodur® 2424 (from Bayer MaterialScience) or Lupranat® MI (from BASF), or as 4,4'-diphenylmethane diisocyanate with an isomer purity of 98% or higher;

mixtures of MDI with homologues of MDI, commercially available e.g. as Desmodur® VL 50 (from Bayer MaterialScience) or Voranate® M 2940 (from Dow);

mixtures of MDI with MDI-carbodiimides, commercially available e.g. as Desmodur® CD (from Bayer MaterialScience), Lupranat® MM 103 (from BASF), Isonate® M 143 or Isonate® M 309 (both from Dow) or Suprasec® 2020 or Suprasec® 2388 (both from Huntsman); or mixtures of MDI with MDI-urethanes, commercially available e.g. as Desmodur® VH20 N, Desmodur® E21, Desmodur® E210 (all from Bayer MaterialScience), Lupranat® MP 102 (from BASF), Echelon® MP 107, Echelon® MP 106 or Echelon® MP 102 (all from Dow).

Preferred is pure MDI or mixtures of MDI with homologues of MDI or mixtures of MDI with MDI-carbodiimides.

Particularly preferred is pure MDI. It provides polyurethane polymers with low viscosity.

Most preferred is 4,4'-diphenylmethane diisocyanate with an isomer purity of 98% or higher. It enables membranes with very high strength and very fast cure speed.

Further most preferred is a mixture of 2,4'-diphenylmethane diisocyanate and 4,4'-diphenylmethane diisocyanate in about equal amounts. It provides polyurethane polymers with very low viscosity.

In another preferred embodiment of the invention, the diisocyanate to obtain the isocyanate-functional polyurethane polymer is TDI. Such a liquid-applied membrane has specific benefits. TDI enables membranes with a particularly low content of monomeric isocyanates and with particularly low viscosity at low solvent content, particularly long pot life and particularly high elongation.

Particularly suitable forms of TDI are mixtures containing ca. 80 weight-% of 2,4-toluylene diisocyanate and ca. 20 weight-% of 2,6-toluylene diisocyanate, commercially available e.g. as Desmodur® T 80 P (from Bayer MaterialScience), Voranate® T-80 (from Dow) or Lupranat® T 80 A (from BASF); or 2,4-toluylene diisocyanate, commercially available e.g. as Desmodur® T 100 SP (from Bayer MaterialScience).

In one embodiment of the invention, the diisocyanate to obtain the isocyanate-functional polyurethane polymer is preferably an aliphatic diisocyanate. A membrane based on aliphatic diisocyanates is particularly low viscous and shows good light-fastness. An aliphatic isocyanate based membrane is particularly useful as a second layer onto an aromatic isocyanates based membrane in order to enhance light-fastness of the system. Such a combination ist particularly useful for waterproofing a roof.

The isocyanate-functional polyurethane polymer is obtained from at least one polyether polyol. Polyether polyols provide good low temperature flexibility in the cured membrane.

Suitable polyether polyols are particularly polyoxyalkylenepolyols. They result from the polymerziation of ethylene oxide or 1,2-propylene oxide or 1,2- or 2,3-butylene oxide or oxetane or tetrahydrofuran or mixtures thereof, optionally polymerized using a starter molecule with two or more active hydrogen atoms, such as water, ammonia or compounds with several OH- or NH-groups such as 1,2-ethanediol, 1,2- or 1,3-propanediol, neopentylglycol, diethyleneglycol, triethyleneglycol, the isomeric dipropyleneglycols or tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Suitable polyoxyalkylenepolyols are obtained by using anionic catalysts such as NaOH, KOH, CsOH or alkali alcoholates, or—preferably—by using so-called double metal cyanide complex catalysts (DMC Catalysts), which provide polyols having a low degree of unsaturation.

A particularly preferred polyether polyol is a polymerization product of ethylene oxide and/or propylene oxide, particularly a polyoxypropylenepolyol or an ethylene oxide endcapped polyoxypropylenepolyol. The latter is a specific polyoxypropylene-polyoxyethylenepolyol obtainable by post-ethoxylation of a pure polyoxypropylenepolyol, thus featuring primary hydroxyl groups.

Most preferred polyether polyols are polyoxypropylenediols and -triols and ethylene oxide endcapped polyoxypropylenediols and -triols with an average molecular weight in the range of 500 to 6'000 g/mol, particularly in the range of 1'000 to 5'000 g/mol.

These polyether polyols enable membranes with low viscosity, good weathering properties and good mechanical properties, particularly good low temperature flexibility.

In a preferred embodiment, the isocyanate-functional polyurethane polymer is obtained from a combination of at least two different polyether polyols, in particular from at least one polyether diol and at least one polyether triol. Such a polyurethane polymer enables membranes with high elongation at high strength and good durability.

Along with the above-mentioned polyether polyols, other polyols can be used, in particular polyether polyols containing dispersed polymer particles such as styrene-acrylonitrile (SAN) or acrylonitrile-methylmethacrylate or urea particles. Such polyols are commercially available e.g. as Lupranol® 4003/1, Lupranol® 4006/1/SC10, Lupranol® 4006/1/SC15, Lupranol® 4006/1/SC25, Lupranol® 4010/1/SC10, Lupranol® 4010/1/SC15, Lupranol® 4010/1/SC25, Lupranol® 4010/1/SC30 or Lupranol® 4010/1/SC40

(all from BASF), Desmophen® 5027 GT or Desmophen® 5029 GT (both from Bayer MaterialScience), Voralux® HL106, Voralux® HL108, Voralux® HL109, Voralux® HL120, Voralux® HL400, Voralux® HN360, Voralux® HN370, Voralux® HN380 or Specflex® NC 700 (all from Dow), Caradol® SP27-25, Caradol® SP30-15, Caradol® SP30-45, Caradol® SP37-25, Caradol® SP42-15, Caradol® SP44-10 or Caradol® MD22-40 (all from Shell);

polyester polyols such as products resulting from the polycondensation reaction of diols or triols with lactones or dicarboxylic acids or their esters or anhydrides;

polycarbonate polyols, particularly products resulting from the polycondensation reaction of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane;

block copolymer polyols with at least two different blocks of polyether, polyester or polycarbonate units;

polyacrylate and polymethacrylate polyols;

polyhydroxy-functional fats and oils, especially natural fats and oils; and polyhydrocarbon polyols, such as polyhydroxy-functional polyolefins.

Preferred thereof are polycarbonate polyols, as they can help to develop good weathering properties of the membrane.

Preferred thereof are further polyether polyols containing dispersed polymer particles, as they can help to develop high strength and good weathering properties of the membrane.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

In a preferred embodiment of the invention the isocyanate-functional polyurethane polymer is obtained from a combination of at least one polyether polyol and at least one difunctional alcohol with a molecular weight in the range of 60 to 150 g/mol. Particularly preferred alcohols are 1,2-ethanediol, 1,3-propanediol, 1,4-butanediol, 1,5-pentanediol, 3-methyl-1,5-pentanediol, 1,6-hexanediol, neopentyl glycol or diethylene glycol.

Most preferred is 1,4-butanediol.

Preferably the difunctional alcohol is used in an amount of between 0.25 and 5 weight-%, in particular between 0.5 and 4 weight-%.

Such a polyurethane polymer enables membranes with particularly high strength.

Preferably the polyol mixture employed to obtain the isocyanate-functional polyurethane polymer contains at least 50 weight-%, more preferably at least 80 weight-%, particularly at least 90 weight-%, of polyether polyols. Such a polyurethane polymer has a low viscosity and enables a high flexibility at low temperatures.

The one-part moisture-curing liquid applied waterproofing membrane further comprises at least one aldimine of the formula (I).

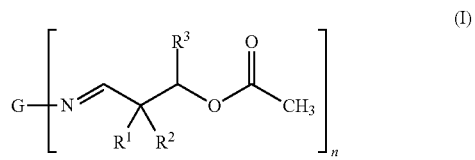

Preferably n is 2 or 3. These aldimines enable membranes with high elasticity.

Preferably $R^1$ and $R^2$ are each methyl. These aldimines enable membranes having low viscosity as well as fast and reliable curing properties.

Preferably $R^3$ is hydrogen. These aldimines enable membranes having low viscosity as well as fast and reliable curing properties.

Particularly preferred are aldimines of the formula (I) wherein $R^1$ and $R^2$ are methyl and $R^3$ is hydrogen.

Preferably G is a di- or trivalent hydrocarbyl moiety of molecular weight in the range of 28 to 1'000 g/mol, particularly 80 to 500 g/mol, optionally containing ether groups.

More preferably G is the moiety remaining when removing the primary amino groups of a polyamine selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylene-diamine, 1,3-bis(aminomethyl) benzene, 1,3-bis(aminomethyl)cyclohexane, 1,4-bis (aminomethyl)cyclohexane, bis(4-aminocyclohexyl) methane, bis(4-amino-3-methylcyclohexyl)methane, 2,5(2,6)-bis-(aminomethyl)bicyclo[2.2.1]heptane, 3(4),8(9)-bis (aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 4(2)-methylcyclohexane-1,3-diamine, 3,6-dioxaoctane-1,8-diamine, 4,7-dioxadecane-1,10-diamine, 4-aminomethyl-1,8-octanediamine, and polyoxypropylene diamines and triamines with an average molecular weight in the range of 200 to 500 g/mol. Preferred polyoxypropylene diamines and triamines are commercially available from Huntsman, BASF and Nitroil. Particularly preferred are Jeffamine® D-230, Jeffamine® D-400 or Jeffamine® T-403.

These aldimines provide membranes with fast curing and good mechanical properties, particularly high strength and elasticity.

Particularly preferred thereof is 3-aminomethyl-3,5,5-trimethylcyclohexylamine.

These aldimines enable membranes with high strength, high elongation and particularly good weathering properties.

Furthermore particularly preferred thereof is hexamethylene-1,6-diamine.

These aldimines enable membranes with particularly fast curing and particularly high strength.

Furthermore particularly preferred thereof are polyoxypropylene diamines with an average molecular weight in the range of 200 to 500 g/mol, particularly Jeffamine® D-230 from Huntsman or corresponding grades from BASF or Nitroil.

These aldimines enable membranes with particularly high elongation.

Furthermore particularly preferred thereof are polyoxypropylene triamines with an average molecular weight in the range of 400 to 500 g/mol, particularly Jeffamine® T-403 from Huntsman or corresponding grades from BASF or Nitroil. These aldimines enable membranes with particularly fast curing properties.

In one embodiment of the invention, G is preferably a divalent or a trivalent hydrocarbyl moiety of average molecular weight in the range of 800 to 5'000 g/mol containing ether groups, particularly a divalent hydrocarbyl moiety of average molecular weight in the range of 1'000 to 3'000 g/mol containing mostly 1,2-oxypropylene units. These aldimines enable membranes with a particularly low viscosity. These aldimines are preferably used in combination with at least one other blocked amine hardener derived from an amine with a molecular weight in the range of 28 to 500 g/mol.

A particularly preferred aldimine of the formula (I) is selected from the group consisting of N,N'-bis(3-acetoxy-2,2-dimethylpropylidene)hexamethylene-1,6-diamine, N,N'-bis(3-acetoxy-2,2-dimethylpropylidene)-3-aminomethyl-3,5,5-trimethylcyclohexylamine, N,N'-bis(3-acetoxy-2,2-dimethylpropylidene)polyoxypropylene diamines with an average molecular weight in the range of 450 to 750 g/mol and N,N',N''-tris(3-acetoxy-2,2-dimethylpropylidene)polyoxypropylene triamines with an average molecular weight in the range of 750 to 900 g/mol.

These aldimines enable membranes with fast curing and good mechanical properties, particularly high strength and elasticity.

Most preferred thereof is N,N'-bis(3-acetoxy-2,2-dimethylpropylidene)-3-aminomethyl-3,5,5-trimethylcyclohexylamine. This aldimine enables membranes with high strength, high elongation and good weathering properties.

Further particularly preferred aldimines of the formula (I) are N,N'-bis(3-acetoxy-2,2-dimethylpropylidene)polyoxypropylene diamines with an average molecular weight in the range of 1'200 to 3'300 g/mol. These aldimines provide membranes with a particularly low viscosity.

It can be advantageous to use a combination of two or more aldimines of the formula (I) in the membrane.

A preferred membrane contains a combination of N,N'-bis(3-acetoxy-2,2-dimethylpropylidene)-3-aminomethyl-3,5,5-trimethylcyclohexylamine and N,N',N''-tris(3-acetoxy-2,2-dimethylpropylidene)-polyoxypropylene triamines with an average molecular weight in the range of 750 to 900 g/mol. This combination enables membranes with high strength and particularly fast curing properties. A further preferred membrane contains a combination of N,N'-bis(3-acetoxy-2,2-dimethylpropylidene)-3-aminomethyl-3,5,5-trimethylcyclohexylamine and N,N'-bis(3-acetoxy-2,2-dimethylpropylidene)polyoxypropylene diamines with an average molecular weight in the range of 1'200 to 3'300 g/mol. This combination enables membranes with a particularly low viscosity at low solvent content and high strength and elongation.

The aldimine of the formula (I) is preferably available from a condensation reaction of at least one primary amine of the formula (II) and at least one aldehyde of the formula (III).

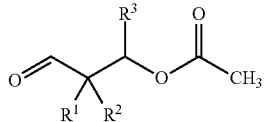

In the formulae (II) and (III), G, n, $R^1$, $R^2$ and $R^3$ have the already mentioned meanings.

Particularly suitable amines of the formula (II) are hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 4(2)-methylcyclohexane-1,3-diamine, 3,6-dioxaoctane-1,8-diamine, 4,7-dioxadecane-1,10-diamine, 4-aminomethyl-1,8-octanediamine, polyoxypropylene diamines and triamines with an average molecular weight in the range of 200 to 500 g/mol, particularly Jeffamine® D-230, Jeffamine® D-400 and Jeffamine® T-403 (from Huntsman) or corresponding amines from BASF or Nitroil, or polyoxypropylene diamines or triamines with an average molecular weight in the range of 800 to 5'000 g/mol, particularly Jeffamine® D-2000 (from Huntsman) or corresponding amines from BASF or Nitroil.

A particularly suitable aldehyde of the formula (III) is 3-acetoxy-2,2-dimethylpropanal. It can be obtained from the esterification reaction between acetic acid and 3-hydroxy-2,2-dimethylpropanal. It is non-toxic, of low odour and low flammability and evaporates quickly from the membrane.

Besides at least one aldimine of the formula (I), the liquid-applied membrane can preferably comprise at least one further blocked amine hardener, particularly an oxazolidine or an aldimine other than the ones of the formula (I).

However, the liquid applied membrane contains preferably at least 30 equivalent-%, more preferably at least 50 equivalent-%, particularly at least 70 equivalent-% of aldimines of the formula (I) referring to the total amount of blocked amine hardener equivalents in the membrane. Such a membrane benefits from the already mentioned advantages such as good storage stability, fast curing properties together with low odour emission, high strength and good overcoatability. Each aldimine group is thereby counted as one equivalent, whereas an oxazolidine group is counted as two equivalents, corresponding to their reactivity towards isocyanate groups.

Suitable oxazolidines are bis-oxazolidines, particularly commercially available bis-oxazolidines such as Incozol® LV, Incozol® 4, Incozol® HP, Incozol® NC, Incozol® CF and Incozol® EH (all from Incorez). To combine an oxazolidine based system with an aldimine of the formula (I) can improve the shelf life stability of the system.

Preferred aldimines other than the ones of the formula (I) are aldimines from the condensation reaction of the before mentioned amines of the formula (II) with aromatic aldehydes, preferably benzaldehyde or substituted benzaldehydes, or with 2,3-unsaturated aldehydes such as cinnamic aldehyde, or with 2,2-disubstituted aliphatic or cycloaliphatic aldehydes such as pivaladehyde, or with esters from 3-hydroxy-2,2-dimethylpropanal and acids such as formic acid or carboxylic acids with more than two carbons, particularly with 2,2-dimethyl-3-lauroyloxypropanal.

In a preferred embodiment of the invention the membrane comprises at least one aldimine derived from 2,2-dimethyl-3-lauroyloxypropanal.

A particularly preferred further blocked amine hardener is an aldimine selected from the group consisting of N,N'-bis(2,2-dimethyl-3-lauroyloxypropylidene)-hexamethylene-1,6-diamine, N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)polyoxypropylene diamines with an average molecular weight in the range of 700 to 3'600 g/mol and N,N',N"-tris(2,2-dimethyl-3-lauroyloxypropylidene)polyoxypropylene triamines with an average molecular weight in the range of 1'200 to 4'000 g/mol, particularly the ones derived from Jeffamine® D-230, Jeffamine® D-400, Jeffamine D-2000, Jeffamine® T-403 and Jeffamine® T-3000 from Huntsman, or corresponding grades from BASF and Nitroil.

Particularly preferred thereof is N,N'-bis(2,2-dimethyl-3-lauroyloxypropylidene)-hexamethylene-1,6-diamine. This aldimine enables membranes with particularly fast curing and high strength.

Furthermore particularly preferred thereof is N,N'-bis(2,2-dimethyl-3-lauroyloxypropylidene)-3-aminomethyl-3,5,5-trimethylcyclohexylamine. This aldimine enables membranes with particularly high strength and high elongation.

Furthermore particularly preferred thereof are N,N'-bis(2,2-dimethyl-3-lauroyloxypropylidene)polyoxypropylene diamines with an average molecular weight in the range of 700 to 800 g/mol. These aldimines enable membranes with fast curing and with particularly high elongation.

Furthermore particularly preferred thereof are N,N'-bis(2,2-dimethyl-3-lauroyloxypropylidene) polyoxypropylene diamines with an average molecular weight in the range of 1'500 to 3'600 g/mol, particularly 2'200 to 2'900 g/mol. These aldimines enable membranes with a particularly low viscosity.

Furthermore particularly preferred thereof are N,N',N"'-tris(2,2-dimethyl-3-lauroyloxypropylidene)polyoxypropylene triamines with an average molecular weight in the range of 1'200 to 1'300 g/mol. These aldimines enable membranes with a particularly fast curing.

A preferred membrane contains a combination of N,N'-bis(3-acetoxy-2,2-dimethylpropylidene)-3-aminomethyl-3,5,5-trimethylcyclohexylamine and N,N'-bis(2,2-dimethyl-3-lauroyloxypropylidene)-3-aminomethyl-3,5,5-trimethylcyclohexylamine. This combination enables membranes with a low viscosity.

A further preferred membrane contains a combination of N,N'-bis(3-acetoxy-2,2-dimethylpropylidene)-3-aminomethyl-3,5,5-trimethylcyclohexylamine and N,N',N"-tris(2,2-dimethyl-3-lauroyloxypropylidene)-polyoxypropylene triamines with an average molecular weight in the range of 1'200 to 1'300 g/mol. This combination enables membranes with particularly fast curing properties.

A further preferred membrane contains a combination of N,N'-bis(3-acetoxy-2,2-dimethylpropylidene)-3-aminomethyl-3,5,5-trimethylcyclohexylamine and N,N'-bis(2,2-dimethyl-3-lauroyloxypropylidene)polyoxypropylene diamines with an average molecular weight in the range of 1'500 to 3'600 g/mol, particularly 2'200 to 2'900 g/mol. This combination enables membranes with a particularly low viscosity at low solvent content and high strength and elongation.

When using a combination of at least one aldimine of the formula (I) and at least one further aldimine derived from 2,2-dimethyl-3-lauroyloxypropanal, it is preferred that the ratio between the aldimine equivalents of aldimines of the formula (I) and of further aldimines is at least 50/50, preferably at least 60/40, more preferably at least 70/30. In the preferred ratio range, the membrane shows a good combination between good workability and high strength.

Preferably the total content of aldimines and optionally oxazolidines in the liquid-applied membrane is such that the ratio between the total number of isocyanate-reactive groups from aldimines and oxazolidines to the number of isocyanate groups is in the range of 0.3 to 1.5, preferably 0.4 to 1.4, more preferably 0.5 to 1.3.

If the membrane is free from oxazolidines, the total aldimine content is preferably such that the ratio between the total number of aldimino groups to the number of isocyanate groups is in the range of 0.3 to 1.1, preferably 0.4 to 1.0, more preferably 0.5 to 1.0, most preferably 0.6 to 1.0.

In this range, the membrane cures quickly without the formation of bubbles or blisters to a flexible material of high strength.

Besides the ingredients already mentioned, the liquid-applied membrane may comprise further ingredients.

The membrane preferably comprises at least one polyisocyanate crosslinker. Preferred polyisocyanate crosslinkers are oligomers or derivatives of diisocyanates such as MDI, TDI, 1,6-hexanediisocyanate (HDI) or 1-isocyanato-3,3,5-trimethyl-5-isocyanatomethyl-cyclohexane (IPDI).

Preferred aliphatic polyisocyanate crosslinkers are HDI-biurets, such as Desmodur® N 100 and N 3200 (from Bayer), Tolonate® HDB or HDB-LV (from Rhodia) or Duranate® 24A-100 (from Asahi Kasei); HDI-isocyanurates, such as Desmodur® N 3300, N 3600 or N 3790 BA (all from Bayer), Tolonate® HDT, HDT-LV or HDT-LV2 (all from Rhodia), Duranate® TPA-100 or THA-100 (from Asahi Kasei) or Coronate® HX (from Nippon Polyurethane); HDI-uretdiones such as Desmodur® N 3400 (from Bayer); HDI-iminooxadiazinediones such as Desmodur® 3900 (from Bayer); HDI-allophanates such as Desmodur® VP LS 2102 (from Bayer) or Basonat® HA 100, Basonat® HA 200 or Basonat® HA 300 (all from BASF); IPDI-isocyanurates such as Desmodur® Z 4470 (from Bayer) or Vestanat® T1890/100 (from Evonik); or mixed isocyanurates based on IPDI/HDI, such as Desmodur® NZ 1 (from Bayer).

Preferred aromatic polyisocyanate crosslinkers are TDI-oligomers such as Desmodur® IL (from Bayer), TDI-urethanes such as Desmodur® L 75, Desmodur® L 67 MPA/X or Desmodur® L 67 BA (all from Bayer); or mixtures of MDI with MDI-homologues or with MDI-carbodiimides such as the already mentioned ones, as well as higher functionality grades such as Desmodur® VL (from Bayer), Isonate® M 304 or Voranate® M 220 or Voranate® M 580 (all from Dow).

Preferred are also mixed aromatic and aliphatic polyisocyanate crosslinkers, in particular isocyanurates based on TDI and HDI, such as Desmodur® HL (from Bayer).

Particularly preferred are polyisocyanate crosslinkers containing aromatic isocyanate groups, particularly for membranes containing an isocyanate-functional polyurethane polymer obtained from aromatic diisocyanates.

A polyisocyanate crosslinker can act as a drying agent and/or can increase the strength of the cured membrane.

The membrane preferably comprises at least one plasticizer, preferably selected from the group consisting of phthalates, trimellitates, adipates, sebacates, azelates, citrates, benzoates, acetylated glycerin or monoglycerides, hydrogenated phthalates, arylsulfonates, phosphates and phosphonates. Phosphates and phosphonates are so-called flame-retarding plasticizers. A preferred flame-retarding plasticizer is diphenylcresyl phosphate (DPK).

The membrane preferably comprises at least one flame-retarding filler. Preferred flame-retarding fillers are aluminum trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine orthophosphate, di-melamine pyrophosphate, hexabromocyclododecane, decabromodiphenyl oxide and tris(bromoneopentyl) phosphate. Particularly preferred thereof is ATH.

The membrane preferably comprises at least one further filler. Preferred further fillers are calcium carbonate (chalk), barium sulfate (barytes), slate, silicates (quartz), magnesiosilicates (talc) and alumosilicates (clay, kaolin). These fillers may or may not carry a surface coating, e.g. a stearate or a siloxane coating. Such fillers can increase strength and durability of the cured membrane.

The membrane preferably comprises at least one acid catalyst. Preferred acid catalysts are carboxylic acids or sulfonic acids, in particular aromatic carboxylic acids such as benzoic acid or salicylic acid. Such catalysts can accelerate the hydrolysis of aldimino groups.

The membrane preferably comprises at least one pigment. Preferred pigments are titanium dioxide, iron oxides or carbon black. Pigments define the colour of the membrane, help to develop strength and can improve durability, particularly UV-stability.

The membrane preferably comprises at least one UV stabiliser. Preferred UV stabilisers are UV absorbers like 2-cyano-3,3-diphenylacrylic acid ethyl ester, or hindered amine light stabilisers (HALS) such as bis(1,2,2,6,6-pentamethyl-4-piperidyl) sebacate. UV stabilisers help to prevent the polymer from degradation under light exposure.

The membrane may further contain the following ingredients:
isocyanate-functional polyurethane polymers obtained from polyols other than polyether polyols, particularly polyester polyols, polycarbonate polyols and polyacrylate polyols;
catalysts other than acid catalysts, particularly metal catalysts, preferably dialkyltin complexes, in particular dibutyltin or dioctyltin carboxylates or acetoacetonates such as DBTDL, DBT(acac)$_2$ or DOTDL, and amine catalysts, preferably tertiary aminoethers, in particular 2,2'-dimorpholinodiethylether (DMDEE);
fillers other than the already mentioned ones such as dolomite, mica, glass bubbles and silicic acid, in particular highly dispersed silicic acids from pyrolytic processes (fumed silica), as well as microspheres and fibres;
organic solvents, particularly hydrocarbons, esters, carbonates or ethers, particularly acetyl acetone, mesityloxide, cyclohexanone, methylcyclohexanone, ethyl acetate, propyl acetate, 1-methoxy-2-propylacetate, butyl acetate, diethyl malonate, diisopropylether, diethylether, dibutylether, ethylene glycol diethylether, diethylene glycol diethylether, toluene, xylenes, heptanes, octanes, diisopropylnaphthalenes and petroleum fractions, such as naphtha, white spirits and petroleum ethers, such as Solvesso™ solvents (from Exxon), hydrogenated aromatic solvents such as hydrogenated naphtha, methylene chloride, propylene carbonate, butyrolactone, N-methyl-pyrrolidone or N-ethyl-pyrrolidone;
additives such as wetting agents, flow enhancers, levelling agents, defoamers, deaerating agents, stabilizers, antioxidants, further drying agents, adhesion promoters, rheology modifiers, particularly fumed silica, or biocides.

Preferably the content of the isocyanate-functional polyurethane polymer in the membrane is in the range of 15 to 70 weight-%, more preferably 15 to 60 weight-%, particularly 15 to 50 weight-%. This enables membranes with good durability and good mechanical properties.

Preferably the membrane has a filler content in the range of 20 to 80 weight-%, more preferably in the range of 30 to 60 weight-%, the filler including inorganic, organic and flame-retarding fillers and pigments. At this filler content the membrane has high strength and durability.

A preferred membrane contains
from 15 to 70 weight-% of the isocyanate-functional polyurethane polymer;
from 20 to 80 weight-% of fillers including flame-retarding fillers and pigments;
from 5 to 30 weight-% of plasticizers including flame-retarding plasticizers;
and comprises at least one further ingredient selected from the group consisting of catalysts, solvents and UV-stabilizers.

Preferably, it comprises at least one flame-retarding ingredient selected from the group consisting of flame-retarding fillers and flame-retarding plasticizers. Such a membrane has good shelf life stability, good workability at low solvent content, good mechanical properties, good durability and a low tendency to develop flames and smoke in case of fire.

Preferably the liquid-applied membrane has a low viscosity. This provides a good workability when applied as a self-levelling coating. Particularly the membrane has a Brookfield viscosity in the range of 500 to 15'000 mPa·s measured at 20° C., preferably in the range of 500 to 10'000 mPa·s, more preferably in the range of 500 to 7'000 mPa·s at 20° C. In this viscosity range the membrane has a good workability with self-levelling properties. If desired, the membrane can be formulated in such a way that it has a certain yield stress in order to stop flowing at some point, by using rheological additives such as fumed silica. This is especially advantageous for applications on sloped surfaces.

Preferably the liquid-applied membrane has a low solvent content. It contains preferably 200 g VOC per liter or less, more preferably 150 g VOC per liter or less.

The one-part moisture-curing liquid-applied waterproofing membrane may be prepared by mixing all ingredients under exclusion of moisture to obtain a homogeneous fluid. It may be stored in a suitable moisture-tight container, particularly a bucket, a drum, a hobbock, a bag, a sausage, a cartridge, a can or a bottle.

The membrane is applied in liquid state within its open time, typically by pouring it onto the substrate, followed by spreading it, e.g. with a roller or a squeegee, to get the desired dry film thickness, which is typically in the range of 0.5 to 3 mm, particularly 0.75 to 1.5 mm.

"Open time" means hereby the period of time between the exposure to moisture and the formation of a skin on the surface of the membrane, also called "tack-free time" or "skinning time".

The liquid-applied membrane is self-levelling, which means its viscosity is low enough to develop an even surface after being spread by rolling or brushing. The curing of the membrane starts when it gets in contact with moisture, typically atmospheric moisture. The curing process works by chemical reaction.

The aldimino groups are activated with moisture and then react with isocyanate groups. Furthermore, the isocyanate groups can also react directly with moisture. As a result of these reactions, the membrane cures to a solid, elastic material. The curing process may also be called crosslinking. After curing, an elastic material with good adhesion to a large number of substrates is obtained. In the course of the curing reaction, the aldehyde of the formula (III) and optionally other aldehydes from other blocked amine hardeners are released. These aldehydes, depending on their volatility and other factors such as their solubility in the membrane, may evaporate from the membrane during or after curing, or may remain in the cured membrane. The most preferred aldehyde of the formula (III), 3-acetoxy-2,2-dimethylpropanal, will evaporate quickly from the membrane, causing a moderate smell during its evaporation. 2,2-Dimethyl-3-lauroyloxypropanal is odourless and remains almost completely in the membrane, reducing odour emission and shrinkage of the membrane.

The membrane can be applied onto a variety of substrates, forming an elastic coating on the substrate. It can be used particularly for waterproofing a roof, a roof deck or a roof garden, as well as a planter, a balcony, a terrace, a plaza or a foundation. It can also be used indoors for waterproofing, particularly under ceramic tiles, e.g. in a bath room, a catering kitchen or a plant room, protecting them from water ingress. The liquid-applied membrane is particularly suitable for refurbishment purposes.

Most preferred is the use of the liquid-applied membrane on a roof, particularly a flat or low slope roof. It can be used to waterproof a new roof as well as for refurbishment purposes and is particularly useful for detailing work.

The liquid-applied membrane is preferably used as part of a waterproofing system, consisting of
  optionally a primer and/or an undercoat,
  one or more than one layer of a membrane according to the invention, preferably in combination with a fibre reinforcement mesh, and
  optionally a top coat.

The liquid-applied membrane is preferably used by being poured onto a substrate, being spread evenly within its open time to the desired layer thickness, typically in the range of 0.5 to 3 mm dry film thickness, particularly in the range of 0.75 to 1.5 mm dry film thickness, by a roller, a brush, a spreading knife or a wiper.

Preferably the fibre reinforcement mesh is applied after the first layer of the membrane, by placing it on top of the freshly applied membrane and then rolling or working it thoroughly into the membrane within the open time of the membrane, particularly by means of a roller or a brush. The membrane with the incorporated fibre reinforcement mesh is then cured at least to the point that it is walkable, before an optional next layer of the membrane or an optional top coat is applied.

In a preferred embodiment the waterproofing system comprises more than one layers of the membrane, wherein the first and optionally a second layer of the membrane are based on aromatic diisocyanate, preferably in combination with a fibre reinforcement mesh, and the top layer of the membrane is a membrane according to the invention based on aliphatic diisocyanate. Such a system benefits from low cost, high reactivity and high strength of the aromatic diisocyanate based layer or layers, as well as from the good UV stability and good light fastness of the aliphatic diisocyanate based top layer of the membrane. Such a system is typically not overcoated with a top coat.

Another subject of the invention is a method of waterproofing a roof structure, comprising
  applying a membrane according to the invention in liquid state onto a substrate of the roof,
  contacting the membrane with a fibre reinforcement mesh within the open time of the membrane,
  exposing the membrane to moisture to thereby cure the membrane to obtain an elastic coating,
  optionally applying a second layer of a membrane according to the invention and curing it by exposure to moisture,
  optionally applying a top coat onto the cured membrane.

The membrane is preferably applied so that a dry film thickness in the range of 0.5 to 3 mm, particularly in the range of 0.75 to 1.5 mm, is obtained for each layer.

The fibre reinforcement mesh is preferably a non-woven polyester fibre mesh and more preferably a non-woven glass fibre mesh.

The fibre reinforcement mesh acts as a reinforcement for the membrane, providing increased strength and durability. The randomly orientated fibres in the preferred non-woven fibre meshes give a multidirectional strength to the membrane while allowing the latter to remain highly elastic. It improves strength, tear resistance and puncture resistance. The non-woven glass fibre mesh shows a particularly easy handling and can easily adapt to a given surface topography. It is important that the mesh is thoroughly wetted by the liquid membrane in order to soften the mesh and allow a full incorporation of the mesh into the membrane. The latter is particularly difficult to achieve with membranes having a low solvent content. The membrane according to the invention is well compatible with such a mesh, providing good wetting and softening of the mesh.

It can be advantageous to apply a top coat onto the top layer of the membrane. The top coat is preferably an elastic material with a high UV-resistance and/or high hardness, so as to enhance light-fastness, particularly for membranes based on aromatic isocyanates, and/or scratch resistance of the waterproofing system. It is typically used in a layer of 30 to 150 µm dry film thickness. Such an UV- and/or scratch-resistant top coat can particularly be based on a polyurethane polymer with aliphatic isocyanates or on any other suitable material. Preferred is a waterbased UV-resistant top coat.

In a preferred embodiment of the invention, the method of waterproofing a roof structure comprises a first layer of an aromatic diisocyanate based membrane and a second layer of an aliphatic diisocyanate based membrane, both layers being membranes according to the invention comprising at least one aldimine of the formula (I). Such a two layer system benefits from low cost of the first layer and good light-fastness of the second layer, whereby the two layers are highly compatible.

Substrates onto which the membrane can be applied are particularly
  concrete, lightweight concrete, mortar, brick, adobe, tile, slate, gypsum and natural stone, such as granite or marble;
  metals and alloys, such as aluminium, copper, iron, steel, nonferrous metals, including surface-finished metals and alloys, such as galvanized metals or chrome-plated metals;

asphalt;
bituminous felt;
plastics, such as PVC, ABS, PC, PA, polyester, PMMA, SAN, epoxide resins, phenolic resins, PUR, POM, PO, PE, PP, EPM, EPDM, in untreated form or surface treated by means of plasma, corona or flame; particularly PVC, PO (FPO, TPO) or EPDM membranes;
timber or plywood;
coated substrates, such as varnished tiles, painted concrete or coated metals.

It can be advantageous to pre-treat the substrate before applying the membrane, for example by washing, pressure-washing, wiping, blowing off, grinding and/or applying a primer and/or an undercoat.

By this method, a waterproof roof structure is obtained comprising the cured membrane, particularly with the incorporated fibre reinforcement mesh. The roof structure is preferably part of the roof of a building, particularly a building from structural and civil engineering, preferably a house, an industrial building, a hangar, a shopping center, a sports stadium or the like.

The one-part moisture-curing liquid-applied waterproofing membrane described herein has a series of advantages. It is interesting from a cost point of view, as it can be based on aromatic isocyanates. It has a good shelf life stability and good workability at low solvent content. It cures fast and reliably with only minimal odour emission when exposed to moisture, being tolerant towards adverse application conditions such as high humidity and early rainfall. When cured it results in an elastic material of high strength and elasticity and good adhesion to most substrates, affording high crack-bridging qualities in a broad temperature range. Despite the low solvent content, it is well compatible with a non-woven glass fibre mesh used as a reinforcement, providing good wetting and softening of the mesh and thus allowing the mesh to be fully incorporated into the membrane. The aldehyde released on curing is of low odour and evaporates quickly from the membrane. The membrane is not prone to bleeding and can thus be durably overcoated without the need for cleaning and without interlayer adhesion problems. These qualities enable the membrane to be particularly useful as a thick layer crack-bridging base coat of a waterproofing roofing system with good mechanical properties at reasonable cost, which is overcoatable by a protective layer with high UV-resistance.

EXAMPLES

"Normal climate" means a temperature of 23±1° C. and a relative atmospheric moisture of 50±5%.

Preparation of Aldimines:

The amine content (total content of free amines and blocked amines, i.e. aldimino groups) of the prepared aldimines was determined by titration (with 0.1 N HClO$_4$ in acetic acid against cristal violet) and is given in mmol N/g.

Aldimine-A1: N,N'-Bis(2,2-dimethyl-3-acetoxypropylidene)-3-aminomethyl-3,5,5-trimethylcyclohexylamine 303 g (2.1 mol) 2,2-dimethyl-3-acetoxypropanal were placed in a round bottom flask under nitrogen atmosphere. Then 170.3 g (1 mol) 3-aminomethyl-3,5,5-trimethylcyclohexylamine (Vestamin® IPD from Evonik) were added under good stirring, followed by removing the volatile contents at 80° C. and 10 mbar vacuum. The yield was 423 g of a nearly colourless liquid with an amine content of 4.70 mmol N/g, corresponding to a calculated aldimine equivalent weight of ca. 213 g/Eq.

Aldimine-B1: N,N'-Bis(2,2-dimethyl-3-lauroyloxypropylidene)-3-aminomethyl-3,5,5-trimethylcyclohexylamine 598 g (2.1 mol) 2,2-dimethyl-3-lauroyloxy-propanal were placed in a round bottom flask under nitrogen atmosphere. Then 170.3 g (1 mol) 3-aminomethyl-3,5,5-trimethylcyclohexylamine (Vestamin® IPD from Evonik) were added under good stirring, followed by removing the volatile contents at 80° C. and 10 mbar vacuum. The yield was 732 g of a nearly colourless liquid with an amine content of 2.73 mmol N/g, corresponding to a calculated aldimine equivalent weight of ca. 367 g/Eq.

Aldimine-B2: N,N',N''-Tris(2,2-dimethyl-3-lauroyloxypropylidene)-polyoxypropylenetriamine Under the same conditions as given for Aldimine-B1, 875 g (3.08 mol) 2,2-dimethyl-3-lauroyloxy-propanal and 440 g (ca. 2.8 mol N) polyoxypropylenetriamine of average molecular weight of about 440 g/mol (Jeffamine® T-403 from Huntsman, amine content 6.40 mmol N/g) were reacted. The yield was 1'264 g of a nearly colourless liquid with an amine content of 2.23 mmol N/g, corresponding to a calculated aldimine equivalent weight of ca. 449 g/Eq.

Isocyanate-Functional Polyurethane Polymers:

The Polymer-1 was prepared by reacting 435.5 g polyoxypropylene diol (Voranol® 2000 L from Dow; OH-number 56.0 mg KOH/g), 60.0 g ethylene oxide endcapped polyoxypropylene triol (Voranol® CP 4755 from Dow; OH-number 34.7 mg KOH/g), 12.0 g 1,4-butanediol and 192.5 g liquid MDI (Desmodur® VL 50 from Bayer; 32.5 weight-% NCO) in the presence of 50.0 g diisodecylphthalate and 250.0 g 1-methoxy-2-propylacetate according to known procedures at 80° C. to obtain an isocyanate-functional polyurethane polymer with an NCO content of 3.1 weight-% (including the plasticizer diisodecylphthalate and the solvent 1-methoxy-2-propylacetate).

Polymer-2 is a solvent- and plasticizer-free polyurethane polymer based on polyoxypropylene diols and TDI, with an NCO content of 3.65 weight-% and a content of monomeric TDI<0.1% (Trixene SC 7721 from Baxenden).

Polymer-3 is a solvent- and plasticizer-free polyurethane polymer based on polyoxypropylene triol and TDI, with an NCO content of 3.3 weight-% and a content of monomeric TDI<0.1% (Trixene SC 7722 from Baxenden).

Polymer-4 is a solvent- and plasticizer-free polyurethane polymer based on polyether polyols and TDI, with an NCO content of 4.4 weight-% and a content of monomeric TDI<0.1% (Trixene SC 7725 from Baxenden).

Polymer-5 is a solvent- and plasticizer-free linear polyether polyurethane polymer based on TDI, with an NCO content of 3.5 weight-% and a content of monomeric TDI<0.5% (Desmodur® E 14 from Bayer MaterialScience).

Polymer-6 is a solvent- and plasticizer-free polyurethane polymer based on polyether polyols and TDI, with an NCO content of 4.4 weight-% and a content of monomeric TDI<0.5% (Desmodur® E 15 from Bayer MaterialScience).

One-Part Moisture-Curing Liquid-Applied Membranes Ex-1 to Ex-14:

For each membrane the ingredients given in Table 1 or 2 were mixed under exclusion of moisture in a sealed poly-propylene beaker by means of a centrifugal mixer (Speed-Mixer™ DAC 150, FlackTek Inc.) until a homogeneous fluid was obtained.

The membranes were stored in a tightly sealed, moisture-proof can for 24 h at ambient temperature and then tested as follows:

The viscosity was measured with a Brookfield DV-E spindle type viscometer, spindle n° 5, 30 rpm, at a temperature of 20° C. "Initial" means the viscosity measured 24 hours after mixing the ingredients. "42d 40° C." means the viscosity measured after a storage time of 42 days at 40° C. in a sealed container. "28d 40° C." means the viscosity measured after a storage time of 28 days at 40° C. in a sealed container. "14d 40° C." means the viscosity measured after a storage time of 14 days at 40° C. in a sealed container.

Cure speed ("BK drying time") was determined at 20° C./45% relative humidity using a Beck-Koller drying time recorder according to ASTM D5895. The result for stage 2 indicates approximately the skinning time of the membrane.

To determine the mechanical properties, a two-layer cured film was prepared for each membrane. To prepare the film, a first layer of 800 μm thickness was applied with a draw down bar and left curing in normal climate (NC) for 24 h; then a second layer of 400 μm thickness was applied thereon at an angle of 90° and again left curing in NC for 24 h; the two-layer film was then placed in an oven at 60° C. for 24 h. After an additional 24 h in NC, bar shaped test pieces with a length of 100 mm and a width of 25 mm were punched from the film and tensile strength and elongation at break determined similar to DIN EN 53504 at a crosshead speed of 180 mm/min with a gauge length of 60 mm.

The examples Ex-6 to Ex-10 are clear resin films without fillers. For each of these examples, a film of 1 mm thickness was allowed to cure for 24 h in NC followed by 24 h at 60° C. and was tested for tensile strength and elongation at break after an additional 24 h in NC as described above.

All the membranes formed flexible films without bubbles and without tack.

The results are given in Table 1, 2 or 3.

The membranes Ex-1 to Ex-14 are membranes according to the invention, the membranes Ref-1 to Ref-2 are comparative examples.

TABLE 1

Composition (in weight parts) and test results of the examples Ex-1 to Ex-5 and Ref-1 to Ref-2.

|  | Ex-1 | Ex-2 | Ex-3 | Ex-4 | Ex-5 | Ref-1 | Ref-2 |
|---|---|---|---|---|---|---|---|
| Polymer-1 | 670.0 | 670.0 | 670.0 | 670.0 | 670.0 | 670.0 | 670.0 |
| Aldimine-A1 | 89.8 | 76.4 | 67.4 | 67.4 | 44.9 | — | — |
| Aldimine-B1 | — | 23.2 | 38.7 | — | 77.4 | 154.8 | — |
| Aldimine-B2 | — | — | — | 47.3 | — | — | — |
| Bis-Oxazolidine[1] | — | — | — | — | — | — | 80.6 |
| Diisodecylphthalate | 280.0 | 280.0 | 280.0 | 280.0 | 280.0 | 280.0 | 280.0 |
| Rheology Modifier | 4.2 | 4.2 | 4.2 | 4.2 | 4.2 | 4.2 | 4.2 |
| Titanium Dioxide | 108.2 | 108.2 | 108.2 | 108.2 | 108.2 | 108.2 | 108.2 |
| Barytes | 169.9 | 169.9 | 169.9 | 169.9 | 169.9 | 169.9 | 169.9 |
| ATH[2] | 569.2 | 569.2 | 569.2 | 569.2 | 569.2 | 569.2 | 569.2 |
| Fumed Silica | 10.0 | 10.0 | 10.0 | 10.0 | 10.0 | 10.0 | 10.0 |
| MPA[3] | 25.0 | 25.0 | 25.0 | 25.0 | 25.0 | 25.0 | 25.0 |
| Drying Agent[4] | 10.7 | 10.7 | 10.7 | 10.7 | 10.7 | 10.7 | 10.7 |
| Salicylic Acid[5] | 5.0 | 5.0 | 5.0 | 5.0 | 5.0 | 5.0 | 5.0 |
| Solvent Content [g/L] | 144 | 143 | 143 | 142 | 143 | 138 | 147 |
| Aldimine (I)/further Aldimine [Eq][6] | — | 85/15 | 75/25 | 75/25 | 50/50 | — | — |
| Viscosity [mPa · s] | | | | | | | |
| initial | 4'050 | 3'630 | 3'380 | 5'230 | 3'120 | 2'950 | 7'800 |
| after 42 d 40° C. | 5'110 | 4'540 | 3'900 | 7'360 | 3'650 | 2'990 | 124'200 |
| BK Drying Time | | | | | | | |
| [h]  Stage 2 | 1.75 | 1.5 | 1.5 | 1.5 | 1.5 | 2.25 | 1.75 |
| Stage 3 | 2.25 | 2 | 1.75 | 2 | 2 | 3 | 2.25 |
| Stage 4 | 5 | 6 | 5.5 | 4 | 6 | 5.25 | 4 |
| Tensile Str. [MPa] | 4.5 | 4.1 | 4.1 | 3.9 | 3.2 | 2.9 | 4.4 |
| Elongation at Break | 179% | 166% | 178% | 156% | 220% | 243% | 65% |

"Str." means "Strength"
[1] Incozol ® 4 from Incorez, equivalent weight 125 g
[2] aluminum trihydroxide powder
[3] 1-methoxy-2-propylacetate
[4] Desmodur ® VL 50 from Bayer MaterialScience, 32.3 weight-% NCO
[5] 10 weight-% in 1-methoxy-2-propylacetate
[6] indicates the approximate ratio between the aldimine equivalents of aldimines of the formula (I) and of further aldimines

TABLE 2

Composition (in weight parts) and test results of the examples Ex-6 to Ex-12.

|  | Ex-6 | Ex-7 | Ex-8 | Ex-9 | Ex-10 | Ex-11 | Ex-12 |
|---|---|---|---|---|---|---|---|
| Polymer-2 | 200.0 | — | — | — | — | 900.0 | 657.0 |
| Polymer-3 | — | 200.0 | — | — | — | — | — |
| Polymer-4 | — | — | 200.0 | — | — | — | — |
| Polymer-5 | — | — | — | 200.0 | — | — | — |
| Polymer-6 | — | — | — | — | 200.0 | — | — |

TABLE 2-continued

Composition (in weight parts) and test results of the examples Ex-6 to Ex-12.

|  |  | Ex-6 | Ex-7 | Ex-8 | Ex-9 | Ex-10 | Ex-11 | Ex-12 |
|---|---|---|---|---|---|---|---|---|
| Crosslinker[1] | | 27.0 | 26.0 | 33.5 | 34.0 | 27.0 | 123.0 | 90.0 |
| Aldimine-A1 | | 56.5 | 53.0 | 69.0 | 69.0 | 53.0 | 257.0 | 188.0 |
| Propylene Carbonate | | — | — | — | — | — | — | 110.0 |
| Diisodecylphthalate | | — | — | — | — | — | 350.0 | 202.7 |
| Defoamer | | — | — | — | — | — | — | 18.6 |
| UV Stabiliser | | — | — | — | — | — | 10.5 | 3.6 |
| HALS | | — | — | — | — | — | — | 9.3 |
| Titanium Dioxide | | — | — | — | — | — | 278.7 | 93.4 |
| ATH[2] | | — | — | — | — | — | — | 298.0 |
| Barytes | | — | — | — | — | — | 386.0 | 133.0 |
| Ground CaCO$_3$ | | — | — | — | — | — | 1525.0 | — |
| Fumed Silica | | — | — | — | — | — | 70.0 | 8.4 |
| Drying Agent[3] | | — | — | — | — | — | 45.5 | 15.4 |
| MPA[4] | | — | — | — | — | — | 550.0 | — |
| Salicylic Acid[5] | | 1.4 | 1.4 | 1.5 | 1.5 | 1.4 | 50.0 | 18.7 |
| Solvent Content [g/L] | | 29 | 29 | 33 | 33 | 30 | 209 | 122 |
| Viscosity | initial | n.d. | n.d. | n.d. | n.d. | n.d. | 1'200 | 2'200 |
| [mPa · s] | 28 d 40° C. | | | | | | 1'600 | 6'400 |
| BK | Stage 2 | n.d. | n.d. | n.d. | n.d. | n.d. | 0.5 | 3.5 |
| Drying [h] | Stage 3 | | | | | | 1 | 3.75 |
| Time | Stage 4 | | | | | | 2 | 5.75 |
| Tensile Str. [MPa] | | 8.9 | 9.0 | 8.6 | 11.4 | 8.3 | 5.5 | 6.5 |
| Elongation at Break | | 530% | 360% | 450% | 240% | 350% | 315% | 410% |

"Str." means "Strength"
"n.d." means "not determined"
[1]Desmodur ® L75 from Bayer MaterialScience, TDI-based urethane, NCO content 13.3 weight-%, contains 25 weight-% ethyl acetate
[2]aluminum trihydroxide powder
[3]Desmodur ® VL 50 from Bayer MaterialScience, 32.3 weight-% NCO
[4]1-methoxy-2-propylacetate
[5]10 weight-% in 1-methoxy-2-propylacetate

TABLE 3

Composition (in weight parts) and test results of the examples Ex-13 and Ex-14.

|  |  | Ex-13 | Ex-14 |
|---|---|---|---|
| Polymer-6 | | 510.0 | 510.0 |
| Crosslinker[1] | | 63.5 | 63.5 |
| Aldimine-A1 | | 131.3 | 87.0 |
| Aldimine-B1 | | — | 87.0 |
| MPA[2] | | 120.0 | 120.0 |
| Diisodecylphthalate | | 163.9 | 135.9 |
| Titanium Dioxide | | 107.0 | 107.0 |
| Barytes | | 150.0 | 150.0 |
| Ground CaCO$_3$ | | 650.0 | 650.0 |
| Fumed Silica | | 20.0 | 20.0 |
| Drying Agent[3] | | 17.0 | 17.0 |
| Salicylic Acid | | 2.0 | 2.0 |
| Ald. (I)/further Ald. [Eq][4] | | — | 66.6/33.4 |
| Density [g/L] | | 1'490 | 1'480 |
| Solvent Content [g/L] | | 112 | 110 |
| Viscosity [mPa · s] | initial | 3'100 | 2'700 |
| | 14 d 40° C. | 6'700 | 3'400 |
| BK | Stage 2 | 1.8 | 2.3 |
| Drying [h] | Stage 3 | 2.2 | 2.5 |
| Time | Stage 4 | 4.8 | 12.0 |
| Tensile Strength [MPa] | | 5.6 | 4.2 |
| Elongation at Break | | 240 | 430 |

[1]Desmodur ® L75 from Bayer MaterialScience, TDI-based urethane, NCO content 13.3 weight-%, contains 25 weight-% ethyl acetate
[2]1-methoxy-2-propylacetate
[3]Desmodur ® VL 50 from Bayer MaterialScience, 32.3 weight-% NCO
[4]indicates the approximate ratio between the aldimine equivalents of aldimines of the formula (I) and of further aldimines Waterproofing Systems Ex-15 to Ex-17:

The waterproofing systems of the examples Ex-15 to Ex-17 were applied on an even concrete surface of 1 m² in normal climate according to the details given in Table 4.

The first layer was applied directly onto the mechanically cleaned concrete surface and spread evenly by a roller.

The fibre reinforcement mesh was worked into the first layer while the first layer was still fluid.

The second layer was applied after 20 hours and spread evenly by a roller.

After another 20 hours the waterproofing system was cured to such an extent, that it was ready to walk over.

TABLE 4 waterproofing systems of the examples Ex-15 to Ex-17.

|  | Ex-15 | Ex-16 | Ex-17 |
|---|---|---|---|
| first layer | 1.25 liter BC-1[1] | 1.0 liter BC-1[1] | 1.25 liter BC-1[1] |
| fibre reinforcement mesh | Premium[2] | Premium[2] | Premium[2] |
| second layer | 0.75 liter TC-1[3] | 0.5 liter TC-2[4] | 0.75 liter TC-2[4] |

[1]BC-1: liquid-applied membrane of the example Ex-14 as described before
[2]glass fibre mat (Sika ® Reemat Premium, Sika)
[3]TC-1: liquid-applied membrane of the example Ex-14 as described before
[4]TC-2: liquid-applied membrane of example Ex-2 described in WO 2014/114641 based on aliphatic polyurethane polymer The waterproofing systems of examples Ex-16 and Ex-17 are systems containing an aromatic polymer based basecoat and an aliphatic polymer based top coat with a particularly good light stability.

The invention claimed is:
1. A waterproofing system comprising:
    optionally a primer and/or an undercoat;
    one or more than one layer of a one-part moisture-curing liquid-applied waterproofing membrane, comprising:
        at least one isocyanate-functional polyurethane polymer obtained from at least one polyether polyol and at least one diisocyanate; and at least one aldimine of the formula (I),

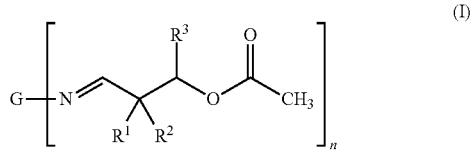

wherein
n is from 2 to 6,
G is an n-valent aliphatic, arylaliphatic or cycloaliphatic hydrocarbyl moiety of molecular weight in a range of 28 to 5,000 g/mol optionally comprising ether or urethane groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring, and
$R^3$ is hydrogen or a linear or branched $C_1$ to $C_{12}$ alkyl or arylalkyl or alkoxycarbonyl,
in combination with a fiber reinforcement mesh, and optionally a top coat.

2. The waterproofing system according to claim 1, wherein the diisocyanate to obtain the isocyanate-functional polyurethane polymer is MOI or TDI.

3. The waterproofing system according to claim 2, wherein the polyether polyol is a polymerization product of ethylene oxide and/or propylene oxide.

4. The waterproofing system according to claim 3, wherein the aldimine of the formula (I) is selected from the group consisting of N,N'-bis(3-acetoxy-2,2-dimethylpropylidene)hexamethylene-1,6-diamine, N,N'-bis(3-acetoxy-2,2-dimethylpropylidene)-3-aminomethyl-3,5,5-trimethylcyclohexylamine, N,N'-bis(3-acetoxy-2,2-dimethylpropylidene)polyoxypropylene diamines with an average molecular weight in the range of 450 to 750 g/mol and N,N',N''-tris(3-acetoxy-2,2-dimethylpropylidene)polyoxypropylene triamines with an average molecular weight in the range of 750 to 900 g/mol.

5. The waterproofing system according to claim 4, comprising:
at least one further blocked amine hardener.

6. The waterproofing system according to claim 5, comprising 200 g VOC per liter or less.

7. The waterproofing system according to claim 1, wherein the polyether polyol is a polymerization product of ethylene oxide and/or propylene oxide.

8. The waterproofing system according to claim 1, wherein the aldimine of the formula (I) is selected from the group consisting of N,N'-bis(3-acetoxy-2,2-dimethylpropylidene)hexamethylene-1,6-diamine, N,N'-bis(3-acetoxy-2,2-dimethylpropylidene)-3-aminomethyl-3,5,5-trimethylcyclohexylamine, N,N'-bis(3-acetoxy-2,2-dimethylpropylidene)polyoxypropylene diamines with an average molecular weight in a range of 450 to 750 g/mol and N,N',N''-tris(3-acetoxy-2,2-dimethylpropylidene)polyoxypropylene triamines with an average molecular weight in a range of 750 to 900 g/mol.

9. The waterproofing system according to claim 8, comprising:
a combination of N,N'-bis(3-acetoxy-2,2-dimethylpropylidene)-3-aminomethyl-3,5,5-trimethylcyclohexylamine and N,N',N''-tris(3-acetoxy-2,2-dimethylpropylidene)-polyoxypropylene triamines with an average molecular weight in a range of 750 to 900 g/mol.

10. The waterproofing system according to claim 1, wherein the membrane comprises:
at least one further blocked amine hardener.

11. The waterproofing system according to claim 10, comprising:
at least 30 equivalent-% of aldimines of the formula (I) referring to a total amount of blocked amine hardener equivalents in the membrane.

12. The waterproofing system according to claim 11, wherein the further blocked amine hardener is an aldimine selected from the group consisting of N,N'-bis(2,2-dimethyl-3-lauroyloxypropylidene)hexamethylene-1,6-diamine, N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)polyoxypropylene diamines with an average molecular weight in a range of 700 to 3,600 g/mol and N,N',N''-tris(2,2-dimethyl-3-lauroyloxypropylidene)polyoxypropylene triamines with an average molecular weight in a range of 1,200 to 4,000 g/mol.

13. The waterproofing system according to claim 12, wherein a ratio between the aldimine equivalents of aldimines of the formula (I) and of further aldimines is at least 50/50.

14. The waterproofing system according to claim 13, wherein the membrane comprises:
from 15 to 70 weight-% of the isocyanate-functional polyurethane polymer;
from 20 to 80 weight-% of fillers including flame-retarding fillers and pigments;
from 5 to 30 weight-% of plasticizers including flame-retarding plasticizers; and
at least one further ingredient selected from the group consisting of catalysts, solvents and UV-stabilizers.

15. The waterproofing system according to claim 1, wherein the membrane comprises 200 g VOC per liter or less.

16. The waterproofing system according to claim 1, in combination with a roof.

17. The waterproofing system according to claim 1 comprising:
more than one layers of the membrane, wherein the first and optionally a second layer of the membrane are based on aromatic diisocyanate, preferably in combination with a fiber reinforcement mesh, and the top layer of the membrane is a membrane according to claim 1 based on aliphatic diisocyanate.

18. A method of waterproofing a roof structure, comprising:
applying a membrane according to claim 1 in liquid state onto a substrate of the roof structure;
contacting the membrane with a fiber reinforcement mesh within the open time of the membrane;
exposing the membrane to moisture to thereby cure the membrane partially or fully to obtain an elastic coating;
optionally applying a second layer of a membrane according to claim 1, and optionally applying a top coat onto the cured membrane.

19. The waterproofing system according to claim 1, consisting of:
a primer and/or an undercoat;
a reinforcement mesh in combination with the one or more than one layer of the membrane; and
a top coat.

* * * * *